(12) United States Patent
Beshai et al.

(10) Patent No.: US 6,768,718 B1
(45) Date of Patent: Jul. 27, 2004

(54) COURTEOUS ROUTING

(75) Inventors: Maged E. Beshai, Stittsville (CA); François J. Blouin, Hull (CA)

(73) Assignee: Nortel Networks Limited, St. Laurent (CA)

(*) Notice: Subject to any disclaimer, the term of this patent is extended or adjusted under 35 U.S.C. 154(b) by 808 days.

(21) Appl. No.: 09/630,190

(22) Filed: Aug. 1, 2000

(51) Int. Cl.[7] ............................................. G01R 31/08
(52) U.S. Cl. ...................................... 370/237; 370/351
(58) Field of Search ................................ 370/229–240, 370/241–44, 248, 249–54, 216–228, 389, 395.1, 395.2, 395.3, 395.31, 395.32, 395.5, 351–3

(56) References Cited

U.S. PATENT DOCUMENTS

| | | | | |
|---|---|---|---|---|
| 6,031,817 | A | 2/2000 | Moy | 370/216 |
| 6,363,319 | B1 * | 3/2002 | Hsu | 701/202 |
| 6,493,317 | B1 * | 12/2002 | Ma | 370/237 |
| 6,522,627 | B1 * | 2/2003 | Mauger | 370/230 |
| 6,538,991 | B1 * | 3/2003 | Kodialam et al. | 370/229 |
| 6,556,544 | B1 * | 4/2003 | Lee | 370/256 |
| 6,584,071 | B1 * | 6/2003 | Kodialam et al. | 370/238 |
| 6,628,649 | B1 * | 9/2003 | Raj et al. | 370/360 |
| 6,633,544 | B1 * | 10/2003 | Rexford et al. | 370/238 |
| 6,665,273 | B1 * | 12/2003 | Goguen et al. | 370/252 |

OTHER PUBLICATIONS

Chatzaki et al., Resource Allocation in Multiservice MPLS, May 31, 1999, IEEE, PP 197–206.*

Daniel O. Awduche, MPLS and Traffic Engineering in IP Networks, IEEE Communications Magazine, Dec. 1999, pp 42–47.

George Swallow, MPLS Advantages for Traffic Engineering, IEEE Communications Magazine, Dec. 1999, pp 54–57.

* cited by examiner

*Primary Examiner*—David Vincent

(57) ABSTRACT

In a communication network comprising nodes and links between the nodes, a controller node disseminates routing information including nodal routing tables. A nodal routing table for a given node comprises alternate routes from the given node to other nodes in the network. A controller of the network receives traffic information from nodes and, based on the received traffic information, determines a set of adaptive routing information corresponding to each said node and transmits each set of adaptive routing information to the respective node. Determining the set of adaptive routing information is performed according to a courteous routing scheme. The routing scheme is labeled as "courteous" because, in a contention state, a node-pair that would suffer the least by directing a part of its traffic away from a preferred path yields to node pairs that suffer more by redirecting their traffic. Courteous routing increases the payload throughput and decreases real-time processing effort. A node, having received the set of adaptive routing information, initializes a set of vacancy vectors. The vacancy vectors are used while allocating incoming connection requests to routes. While a connection is allocated to a route, the available capacity of the allocated route, as reported in the vacancy vector, is reduced by the load of the allocated connection.

23 Claims, 17 Drawing Sheets

SOURCE / SINK

|   | A | B | C | D |
|---|---|---|---|---|
| A | 0 | 3 | 5 | 8 |
| B | 8 | 0 | 6 | 2 |
| C | 3 | 7 | 0 | 6 |
| D | 5 | 6 | 5 | 0 |

404

SOURCE / SINK

|   | A | B | C | D |
|---|---|---|---|---|
| A | 0 | 5 | 6 | 5 |
| B | 6 | 0 | 7 | 3 |
| C | 2 | 6 | 0 | 8 |
| D | 8 | 5 | 3 | 0 |

406

SOURCE / SINK

|   | A | B | C | D |
|---|---|---|---|---|
| A | 0 | 9 | 7 | 0 |
| B | 4 | 0 | 0 | 12 |
| C | 9 | 3 | 0 | 4 |
| D | 3 | 4 | 9 | 0 |

|   | A | | B | | C | | D | | E | |
|---|---|---|---|---|---|---|---|---|---|---|
|   | ROUTE | COST | ROUTE | COST | ROUTE | COST | ROUTE | COST | ROUTE | COST |
| A |  |  | {AB} | 9 | {AC} | 6 | {ABD} | 14 | {ACE} | 14 |
|   |  |  | {ACB} | 17 | {ABC} | 20 | {ACD} | 18 | {ABDE} | 23 |
| B | {BA} | 9 |  |  | {BC} | 11 | {BD} | 5 | {BDE} | 14 |
|   | {BCA} | 17 |  |  | {BAC} | 15 | {BCD} | 23 | {BCE} | 19 |
|   | {BDCA} | 23 |  |  | {BDC} | 17 | {BACD} | 27 | {BACE} | 23 |
| C | {CA} | 6 | {CB} | 11 |  |  | {CD} | 12 | {CE} | 8 |
|   | {CBA} | 20 | {CAB} | 15 |  |  | {CBD} | 16 | {CDE} | 21 |
|   | {CDBA} | 26 | {CDB} | 17 |  |  | {CED} | 17 | {CBDE} | 25 |
|   | {CEDBA} | 31 | {CEDB} | 22 |  |  | {CABD} | 20 | {CABDE} | 29 |
| D | {DBA} | 14 | {DB} | 5 | {DC} | 12 |  |  | {DE} | 9 |
|   | {DCA} | 18 | {DCB} | 23 | {DBC} | 16 |  |  | {DCE} | 20 |
|   | {DECA} | 23 | {DECB} | 28 | {DEC} | 17 |  |  | {DBCE} | 24 |
| E | {ECA} | 14 | {EDB} | 14 | {EC} | 8 | {ED} | 9 |  |  |
|   | {EDBA} | 23 | {ECB} | 19 | {EDC} | 21 | {ECD} | 20 |  |  |

|  | | ROUTE DESTINATION | | | | |
|---|---|---|---|---|---|---|
|  | | 902A | 902B | 902C | 902D | 902E |
| ROUTE SOURCE | 902A |  | 0.6 | 0.7 | 0.1 | 0.5 |
| | 902B | 0.7 |  | 0.7 | 0.5 | 0.3 |
| | 902C | 0.2 | 0.4 |  | 1.0 | 0.5 |
| | 902D | 0.3 | 1.4 | 0.3 |  | 0.2 |
| | 902E | 0.4 | 0.2 | 0.4 | 0.8 |  |

FIG. 11

COURTEOUS ROUTING

FIELD OF THE INVENTION

The present invention relates to routing schemes in communication networks and, more particularly, to a courteous routing scheme.

BACKGROUND OF THE INVENTION

Routing in a telecommunication network is a critical function that shapes the design and operation of the network. The routing function in circuit-switched and data networks has been extensively studied. In particular, routing schemes in circuit-switched networks, such as the public switched telephone network (PSTN), have been enhanced over the past few decades. However, circuit-switched networks are not, at present, undergoing any significant changes, and currently-employed routing schemes, such as classical hierarchical routing and the variety of flat-routing schemes including those known as adaptive routing, dynamic routing and high-performance routing, are likely to remain unchanged. Data networks, in contrast, are undergoing significant changes. In particular, the Internet has experienced very rapid growth in coverage and capacity. In addition to coverage and capacity expansion, it is now widely recognized that quality control is a major requirement for an effective global Internet. The manner in which quality-of-service (QoS) and grade-of-service (GoS) are controlled is determined primarily by schemes employed for routing and traffic allocation. A node controlling QoS or GoS should have an ability to allocate traffic loads among alternative outgoing routes.

A network may be modeled as comprising nodes that are fully or partially interconnected by (transmission) links, where the links may have different capacities and different associated costs. As well, the number of links emanating from each node may vary from one node to another. The term "node", as used herein, is used for a router or switch responsible for routing and traffic allocation. A route is a link or a chain of links connecting a source node to a sink node where a source node is the node supporting traffic sources (the origins of traffic) and a sink node is the node supporting traffic sinks (the destinations of traffic). A node functioning as a router determines a subjective "best route" to another node based on various factors which may be combined to determine a cost factor. The factors may include qualities such as reliability and delay. A node may function as a source node and a sink node for distinct streams of traffic.

A source node and a sink node form a "node-pair". For a particular node-pair, each member of an associated "route set" is a different route between the source node and the sink node that comprise the node-pair. The routes within each route set may be selected to have different first links and may be ranked according to such criteria as total cost and route intersection levels. Conventionally, the route sets for different node-pairs are, however, determined independently without considering the level of intersection among routes connecting different sources to sinks.

Upon arrival of a connection request at a particular node, a controller of that particular node may allocate the requested connection to one of the routes in a route set associated with the node-pair comprising the particular node and the sink node specified by the connection request. In one routing scheme, the route to which the requested connection is allocated may be, for instance, the highest ranked route that has sufficient free capacity, where the routes of a route set are ranked by cost.

In many routing schemes, a particular route in a route set may further have an x associated "static route capacity" which is representative of the full capacity of the link in the route that has least capacity. By definition, the "full capacity" of a link is the maximum data rate that can be supported by the link. The static route capacity of a particular route in a route set may be included in the same data structure that identifies the path of each route in the route set, or may otherwise be made available to a source node. However, the full capacity of one link in the particular route may not always be available to a source node considering allocation of a connection to the particular route.

Traffic allocated to routes in distinct route sets may compete for the capacities of common links. This results in two undesirable effects. The first is that a high proportion of connection attempts may fail to use the best route, leading to use of other routes in respective route sets for the node-pairs and increasing the required computational effort. The second is that haphazard redirection of a connection away from its best route may lead to a connection being allocated to a next best route in a meager route set (i.e., a route set with few members). Where one connection between a first node-pair has been allocated to a first route, the next best route in the meager route set of a second node-pair may be significantly more costly than the next best route in the route set for the first node-pair.

SUMMARY OF THE INVENTION

The routing scheme of the present invention is called "courteous" because the node-pair that suffers the least by a diversion of a part of its traffic to a higher-cost route yields the use of a potentially overloaded link to node-pairs that suffer more by redirecting traffic. The method of the present invention involves providing nodes with route-adaptation information including a route set for each node-pair, and a load-adaptation vector to associate with each route set. A route set includes a number of alternate routes from a source node to a sink node and a load-adaptation vector influences the allocation of traffic to individual routes within the route set with which it is associated. The method uses a minimum-penalty criterion with minimum route-intersection to resolve conflicting objectives. The route-adaptation information may, periodically, be updated in response to a metric representative of traffic change exceeding a threshold.

In accordance with an aspect of the present invention there is provided, at a controller of a network, the network including nodes and links between the nodes, a method of distributing routing information to the nodes, the method including receiving traffic information from the nodes and, based on the received traffic information, determining adaptive routing information corresponding to each node. The method further includes transmitting to each node the corresponding adaptive routing information for use by each node in making traffic routing decisions. In a further aspect of the present invention, there is provided a software medium that permits a general purpose computer to carry out this method.

In accordance with a further aspect of the present invention there is provided, in a network including nodes interconnected by links, where each of the nodes has a route set corresponding to each other of the nodes in the network, and each route set comprises a set of routes to the each other of the nodes in the network, a method of route capacity allocation, including transmitting, to each of the nodes, node-specific adaptive routing information for use by each of the nodes in route capacity allocation, and receiving traffic information from the nodes. The method further includes, responsive to a determination that, based on the received traffic information and the node-specific adaptive routing information, traffic allocated to two or more routes having a common link may overload the common link, altering the node-specific adaptive routing information such that a proportion of traffic allocated to a given route of the two or more routes having the common link is re-directed to an alternate route where the given route is in a given route set in which a cost differential between the given route and the alternate route is a minimum. The method also includes transmitting the altered node-specific adaptive routing information to each of the nodes to which the altered node-specific adaptive routing information corresponds.

In accordance with a further aspect of the present invention there is provided, at a first node in a network, the network including nodes, links between the nodes and a controller, a method of allocating connection requests to routes, the method including receiving a load-adaptation vector, the load-adaptation vector corresponding to a route set including different routes between the first node and a second node in the network, each element in the load-adaptation vector corresponding to a unique route in the route set and having a value for influencing allocation of traffic to the unique route. The method also includes initializing a vacancy vector, receiving a request to connect the first node to the second node, the request having an associated load size and comparing an element in the vacancy vector to the load size. Where a given element in the vacancy vector exceeds or equals the load size, the method includes allocating the request to a route corresponding to the given element and reducing the available capacity indicated by the given element by the load size. In another aspect of the invention a node is provided for performing this method. In a further aspect of the present invention, there is provided a software medium that permits a general purpose computer to carry out this method.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of this invention:

FIG. 4 illustrates three exemplary traffic matrices in an embodiment of the present invention;

FIG. 10 illustrates an independent routing table for the network of FIG. 9;

FIG. 11 illustrates a traffic matrix for the network of FIG. 9;

DETAILED DESCRIPTION OF THE PREFERRED EMBODIMENTS

Figure 1:
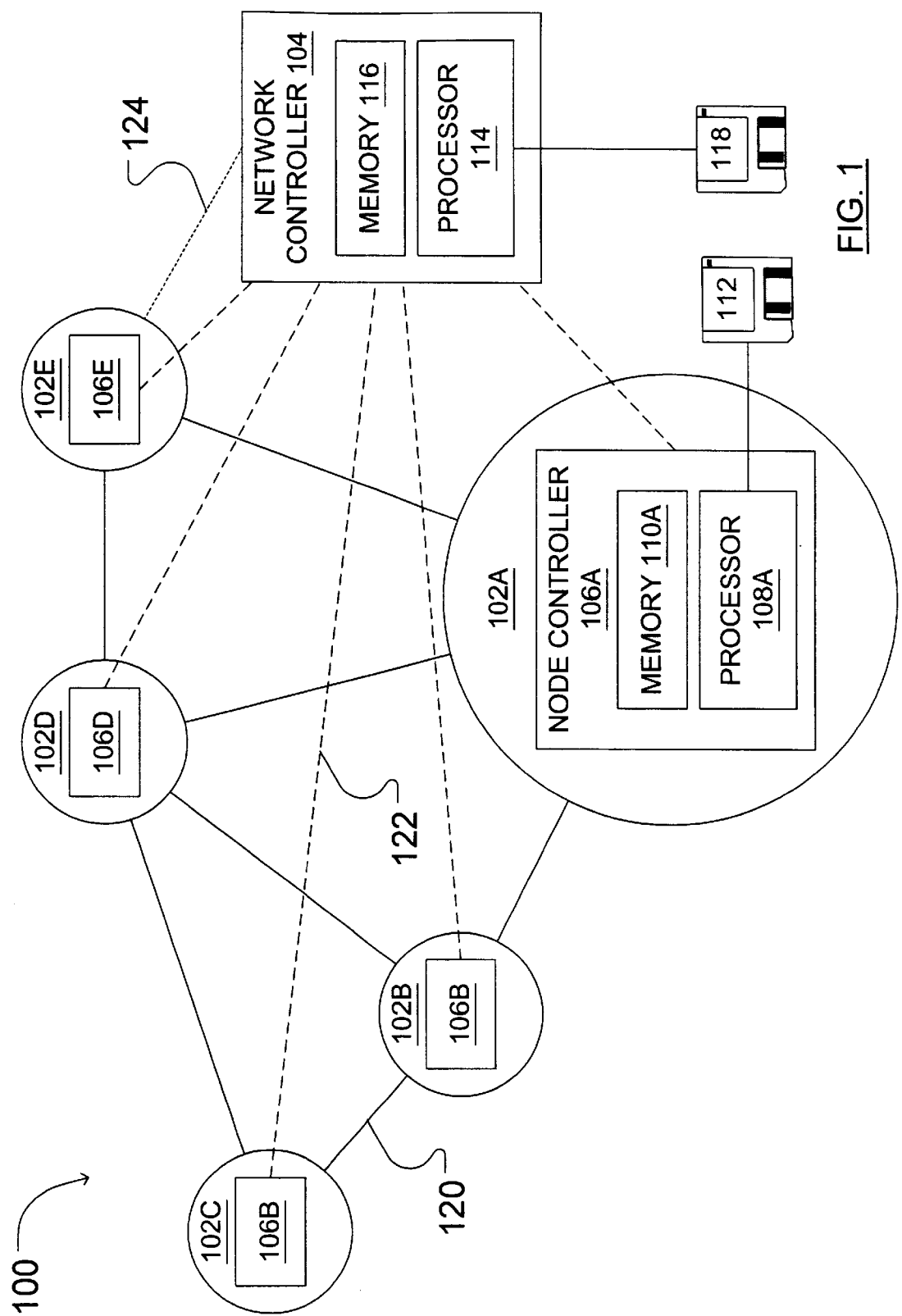
FIG. 1 is a schematic network of nodes representing a communications network.

FIG. 1 models a communication system as a graph 100 of nodes 102A, 102B, 102C, 102D and 102E which are interconnected by payload links 120. "Node", as used herein, is another name for a router or switch. A number of subtending traffic sources and traffic sinks (work stations, servers, etc., not shown) may be connected to each of the nodes 102. Each of the payload links 120 (shown in solid lines) in graph 100 may be representative of a single unidirectional link or two unidirectional links, one unidirectional link for each of the opposite directions. Each node 102A, 102B, 102C, 102D and 102E is shown to comprise a corresponding node controller 106A, 106B, 106C, 106D and 106E. An exemplary node controller 106A is shown to comprise a memory 110A and a processor 108A loaded with traffic allocation software for executing a method of this invention from software medium 112. Each node controller 106 communicates with a network controller 104 through a control channel 122 (shown in dashed lines). Network controller 104 is available to communicate with nodes 102 through a connection 124 to a port on node 102E. The control channels 122 would typically be embedded in payload links 120. Network controller 104 comprises a memory 116 and a processor 114 loaded with load-adaptation vector determining software for executing a method of this invention from software medium 118 which, like software medium 112, could be a disk, a tape, a chip or a random access memory containing a file downloaded from a remote source. In a large-scale network, having, for example, several thousand nodes, network controller 104 may be distributed among nodes 102 and each control channel 122 may be a virtual channel within a payload link 120.

In operation, a given node receives a request for a connection to a particular sink node and allocates traffic associated with the request to a route in a route set associated with the node-pair comprising the given node and the sink node. Where traffic load is a measure of capacity required by a connection, a divisible traffic load may be allocated to several different routes of a route set. The computation of capacity requirements, based on traffic-load characterization, is well known in the prior art. Since traffic between two nodes is usually divisible (i.e., comprising numerous connections that may be routed differently), and route capacity is typically at least two orders of magnitude larger than the capacity requirement of a connection, a load-adaptation coefficient may be associated with each route in a route set. Such a coefficient for a given route in the route set represents the fraction of the total node-pair traffic-load which is carried by the given route such that the sum of the coefficients for a given route set is unity. Thus, the load-adaptation coefficients for a five member route set denoted [R1, R2, R3, R4, R5] may be [0.2, 0.1, 0.4, 0.05, 0.25] at one instant and, at another instant, the load-adaptation coefficients may change to [0.16, 0.24, 0.32, 0.0, 0.28]. A coefficient of zero may indicate that at least one link in the corresponding route is fully loaded or that the corresponding route is inoperable due to failure. Such a failure may be determined upon receipt of a link state change indication generated at a network controller in response to learning of a link failure. A coefficient, set to zero on a received indication of a link failure, is restored upon receipt of a link state change indication generated at a network controller in response to learning of a link recovery. A load-adaptation vector may be defined for each route set to combine load-adaptation coefficients and a node-pair traffic-load value. The node-pair traffic-load value is the lesser of the sum of the static route capacity of each route in the route set and an anticipated traffic load for the entire route set. Each element in a load-adaptation vector is the product of the node-pair traffic-load value and the load-adaptation coefficient specified for a respective route. For instance, if a node-pair traffic-load value is 50, measured in the same (arbitrary) traffic units used to quantify the load-adaptation vector, and the load-adaptation coefficients are [0.2, 0.1, 0.4, 0.05, 0.25], the corresponding load-adaptation vector would be [10.0, 5.0, 20.0, 2.5, 12.5]. A capacity vector may be generated at each node to indicate the capacity (measured in arbitrary traffic load units) of each direct link from another node. An exemplary capacity vector for a node in a ten node network may be [200, 0, 0, 100, 50, 70, 0, 100, 25, 50] where an element with a value of zero represents a lack of a direct link to the node corresponding to the element. The link capacity is always measured in bits per second.

A given node maintains a record of traffic allocated to each route in a route set in an occupancy vector. The given node also initializes a vacancy vector for a particular route set that provides an indication of available capacity for each route in the route set. A vacancy vector is based on a load-adaptation vector, received from a network controller, and a current occupancy vector. Initializing a vacancy vector involves setting each element of the vacancy vector equal to the difference between corresponding elements in the load-adaptation vector and the current occupancy vector, as discussed hereinafter in conjunction with FIG. 14. Upon receiving a connection request, the given node allocates the request to the highest ranked route in the appropriate route set having sufficient remaining capacity. In the vacancy vector, the element corresponding to the route to which the connection has been allocated is reduced by the amount of traffic load requested in the connection request. Once the allocated connection has completed use of the route, the vacancy vector may be updated to reflect the return of available capacity to the formerly allocated route. The vacancy vector for a given route set is re-initialized each time a new load-adaptation vector is received from the network controller for the route set.

In overview, the method of the present invention initially involves allocation of traffic load in a "selfish" manner, that is, each stream of traffic is tentatively allocated to the best route from source to destination without regard for allocation of other streams to their respective best routes. Through such tentative allocation, potentially overloaded links may be identified. If potentially overloaded links are identified, the tentative traffic allocation is adapted such that some node-pairs, those which suffer least by a transfer of partial, or full, traffic load to higher-cost routes, yield the use of a potentially overloaded link to node-pairs that suffer more by redirecting traffic.

Figure 2:
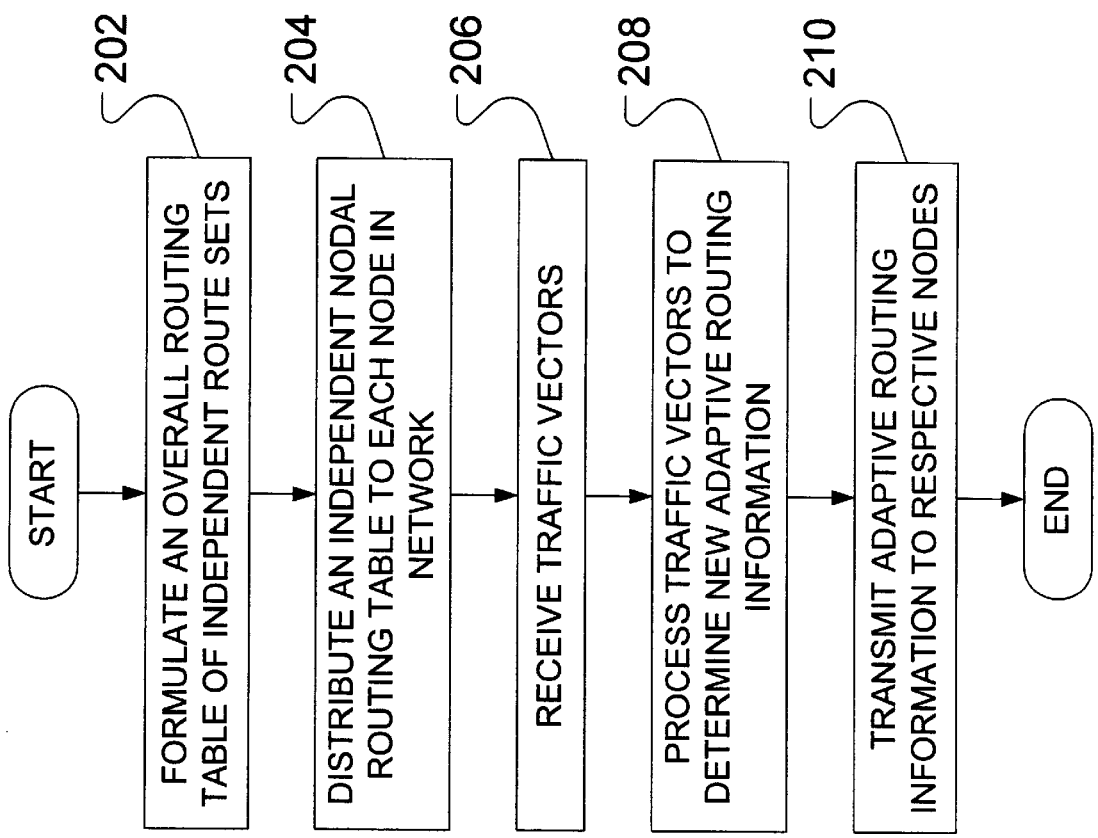
FIG. 2 illustrates, in a flow diagram, a load-adaptation vector distribution method in an embodiment of the present invention.

With reference to FIGS. 1 and 2, an overall routing table comprising independent route sets for each node-pair in graph 100 is formulated at network controller 104 (step 202). For a method of formulating an overall routing table comprising route sets which takes into account competition for the capacity of a given link between routes within a given route set, see U.S. patent application Ser. No. 09/405003, filed Sep. 27, 1999, and hereby incorporated by reference. Subsequent to overall routing table formation, a node-specific nodal routing table may be distributed (step 204), over a control channel 122, to node controllers 106A, 106B, 106C, 106D and 106E. A nodal routing table for a particular source node comprises a ranked route set corresponding to each sink node in graph 100. Each route in a route set may be specified such that it includes identifiers of intermediate nodes, if any, between the source node and the sink node and, optionally, reserved capacity. Periodically, node controllers 106 may report traffic information to network controller 104 including traffic load to each other node. When a change in the capacity of a link occurs, node controllers 106 may also report this change to network controller 104. Network controller 104 receives this traffic information (step 206) over a control channel 122, from node controllers 106A, 106B, 106C, 106D and 106E. The received traffic information may then be processed (step 208). Based on a traffic deviation metric (derived from the received traffic information) 5 exceeding a threshold, network controller 104 may update load-adaptation vectors (generally speaking, adaptive routing information). These updated load-adaptation vectors may then be transmitted to node controllers 106A, 106B, 106C, 106D and 106E (step 210).

Figure 3:
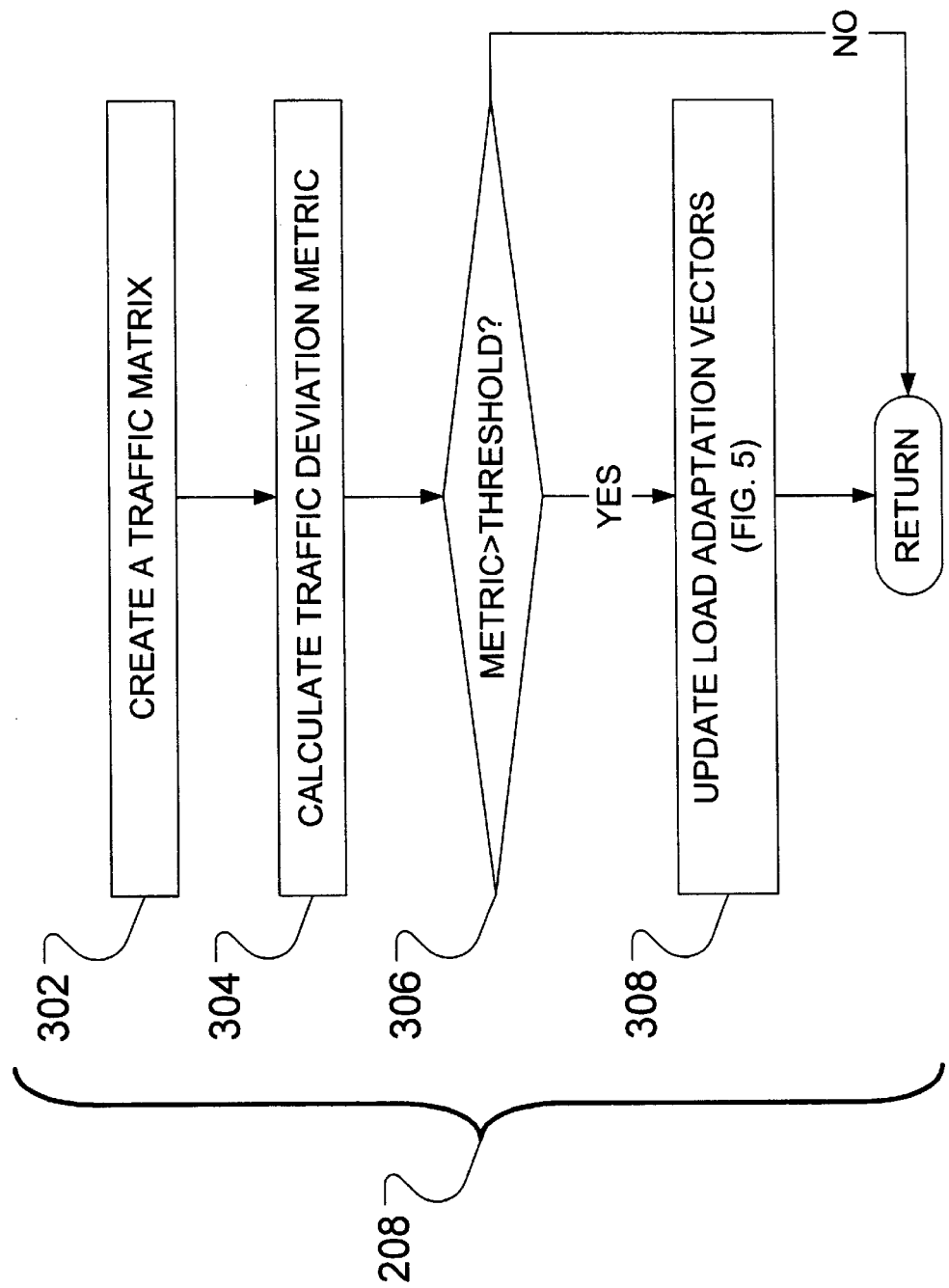
FIG. 3 illustrates, in a flow diagram, a traffic measurement processing method as part of the method illustrated in FIG. 2.

Step 208 of FIG. 2 is expanded upon in FIG. 3. Network controller 104 (FIG. 1) receives a traffic load vector (step 206, FIG. 2) from each node controller 106 indicating 10 expected traffic loads. Such a traffic load vector includes an element corresponding to each other node. Each element in a traffic load vector is representative of the average, or filtered, traffic load transmitted to the node corresponding to the element. These traffic load vectors are combined to create (step 302) a new traffic matrix such as that shown at 404 in FIG. 4. The new traffic matrix is compared to a previous traffic matrix (step 304), such as that shown at 402 in FIG. 4, such that the comparing results in a traffic deviation metric $\Delta$. The metric $\Delta$ is preferably normalized to lie in the range from 0.0 to 1.0. The traffic deviation metric is compared to a predetermined threshold (step 306). If the traffic deviation metric does not exceed the threshold, the traffic processing step is complete. However, if the traffic deviation metric exceeds the threshold, the set of load-adaptation vectors is updated (step 308) based on the new traffic matrix. A typical value of a normalized threshold is 0.05.

FIG. 4 illustrates a number of exemplary traffic matrices created (step 302) from received traffic-load vectors after successive time intervals. Traffic deviation metric $\Delta$ may be computed by summing the magnitude of change in traffic for each node-pair in a network. As such, traffic deviation metric $\Delta$ may be computed as $$\Delta = \frac{\sum_i \sum_j |y_{ij} - x_{ij}|}{\sum_k c_k}$$

where $y_{ij}$ is used to represent an element in a new traffic matrix corresponding to the traffic between source node i and sink node j, $x_{ij}$ is used to represent an element in a previous traffic matrix and $C_k$ is used to represent the total access capacity of node k, i.e., the combined capacity provided to the traffic sources and sinks supported by node k. For example, the traffic deviation metric $\Delta$ computed through a comparison of traffic matrix 402 to traffic matrix 404 may be 20/80, where 80 is an exemplary total capacity of the network in question. Similarly, the traffic deviation metric $\Delta$ computed through a comparison of traffic matrix 404 to traffic matrix 406 is then 54/80 and the traffic deviation metric $\Delta$ computed through a comparison of traffic matrix 406 to traffic matrix 402 is 56/80.

Figure 5:
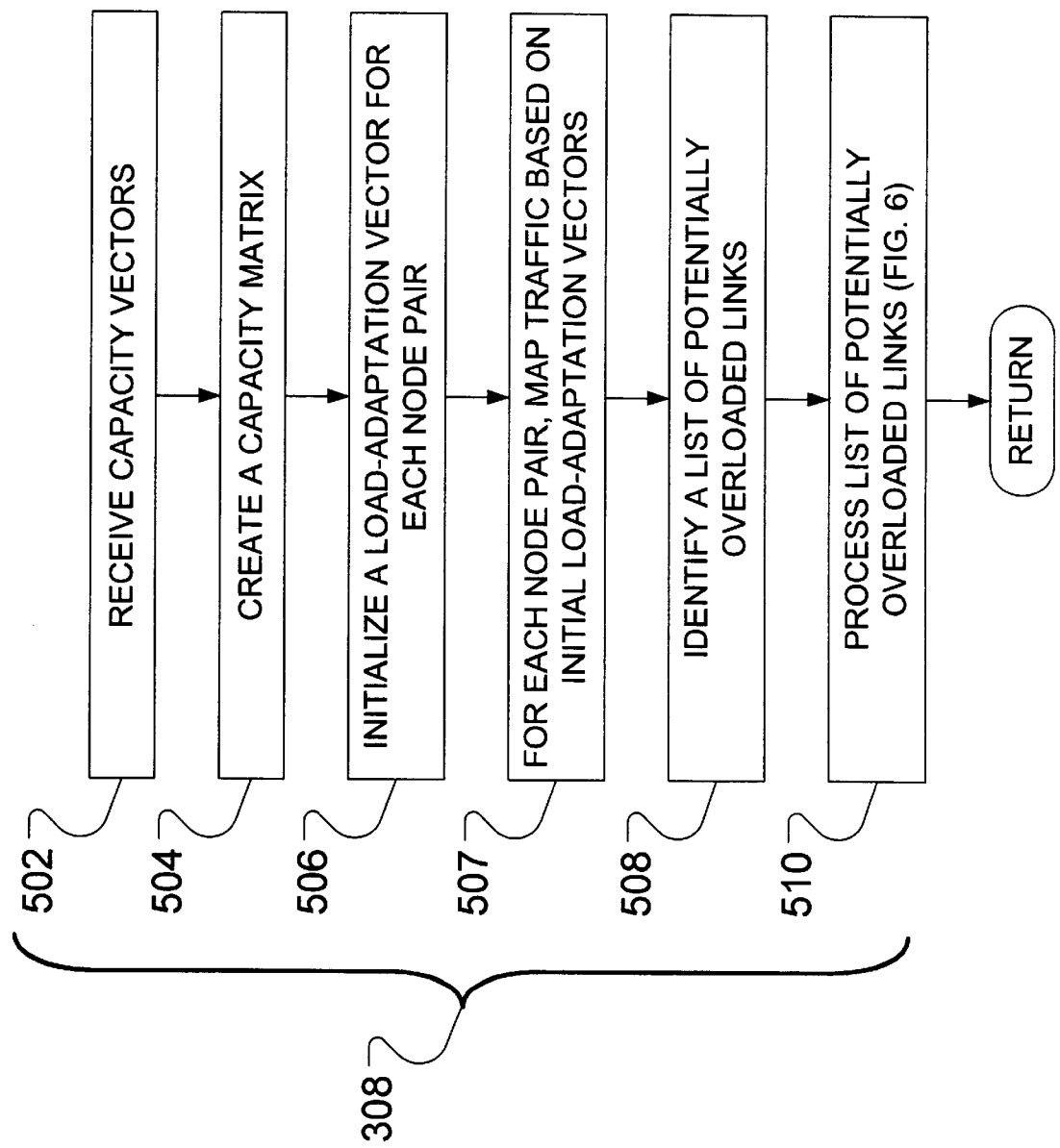
FIG. 5 illustrates, in a flow diagram, a load-adaptation vector determination method as part of the method illustrated in FIG. 3.

FIG. 5 illustrates steps involved in a procedure, used in step 308 of FIG. 3, for determining load-adaptation vectors at network controller 104. Once capacity vectors have been received from node controllers (step 502), the network controller can create a capacity matrix (step 504) indicating the capacity of each link. A load-adaptation vector is then initialized for each node-pair (step 506). In accordance with each initialized load-adaptation vector, all traffic is tentatively mapped to the highest ranked route in the corresponding route set in the overall routing table (step 507). The highest ranked route may be the shortest route, the minimum cost route or a "best" route dependent upon the manner in which the route set is ranked. Traffic loads, as recorded in the traffic matrix, are then allocated to routes according to the initialized load-adaptation vectors. Based on this allocation, a link load matrix may be generated to indicate the traffic load on each link. Using this link load matrix, potentially overloaded links are identified and used to form a list ranked from greatest to least excess load (step 508). The list created in step 508 is then processed to reduce, and, if possible, eliminate, traffic load in excess of the capacity of each of the links in the list (step 510). The goal of step 510, then, is to minimize the quantity of links in the list.

Figure 6:
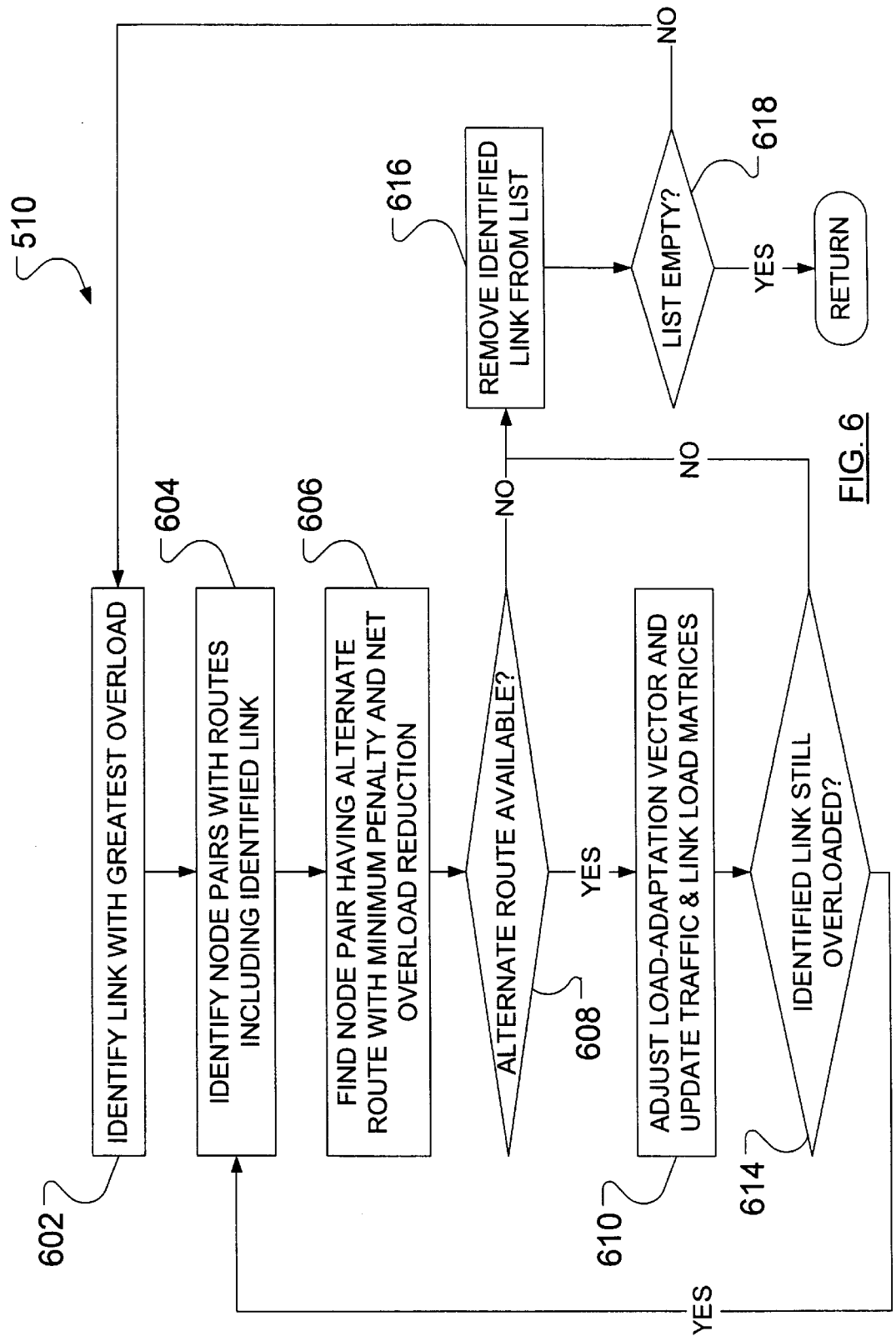
FIG. 6 illustrates, in a flow diagram, an overloaded link processing method as part of the method illustrated in FIG. 5.

The steps involved in processing the list of potentially overloaded links in step 510 of FIG. 5 are outlined in FIG. 6. Initially, the link with the greatest potential overload is identified (step 602). Put another way, the link whose traffic load, if allocated according to initialized load-adaptation vectors, exceeds the capacity of the link by the greatest amount is identified. Once the link with the greatest potential overload is identified, those node-pairs having traffic loads allocated to routes which include the identified potentially overloaded link are identified (step 604). Procedures for identifying routes which include a particular link are known. The routes which have allocated loads and include the identified overloaded link are then considered to determine which of these routes has a minimum penalty alternate route (step 606). A penalty may be determined for reallocating a portion of the load on a route using the identified link to an alternate route (with the same source and sink) based on cost and available capacity on the alternate route as well as an amount of excess load on the identified link. If an alternate route is determined (step 608) to be available, i.e., to have sufficient free capacity, adjustments may be made to the load-adaptation vector corresponding to the node-pair having the minimum penalty alternate route (step 610). By way of these adjustments, all or part of the traffic load on a route using the identified link is tentatively reallocated to an alternate route and thus the tentative load on the overloaded link is reduced. Tentatively reallocating traffic from the route using the identified link to an alternate route may overload another link. Accordingly, care should be taken to select an alternate route that at least results in a net reduction of overload. Corresponding adjustments are also made to the traffic matrix and the link load matrix. Once the adjustments of step 610 are complete, the link in question may be re-examined to determine whether the link is still overloaded (step 614). If the link is still overloaded, those node-pairs having traffic load allocated to routes which include the identified link are again identified (step 604) and the process of reducing load on the overloaded link repeated. If the link is no longer overloaded, the link is removed from the list (step 616) and the list is reviewed (step 618). Removal of the link from the list (step 616) and review of the list (step 618) may also occur if an alternate route is determined not to be available in step 608, in which case some connection requests must be rejected, as will be explained later. If the list is empty, the overloaded link processing is complete. However, if there exist further overloaded links, the procedure begins again by identifying the link with the greatest excess load (step 602).

At the end of this processing of potentially overloaded links, there may exist potentially overloaded links whose load may not be reduced. Load-adaptation vectors may identify routes using these potentially overloaded links so that nodes may reject connection requests, which would normally be allocated to these routes, based on a pre-established policy relating to such criteria as Quality of Service.

Figure 7:
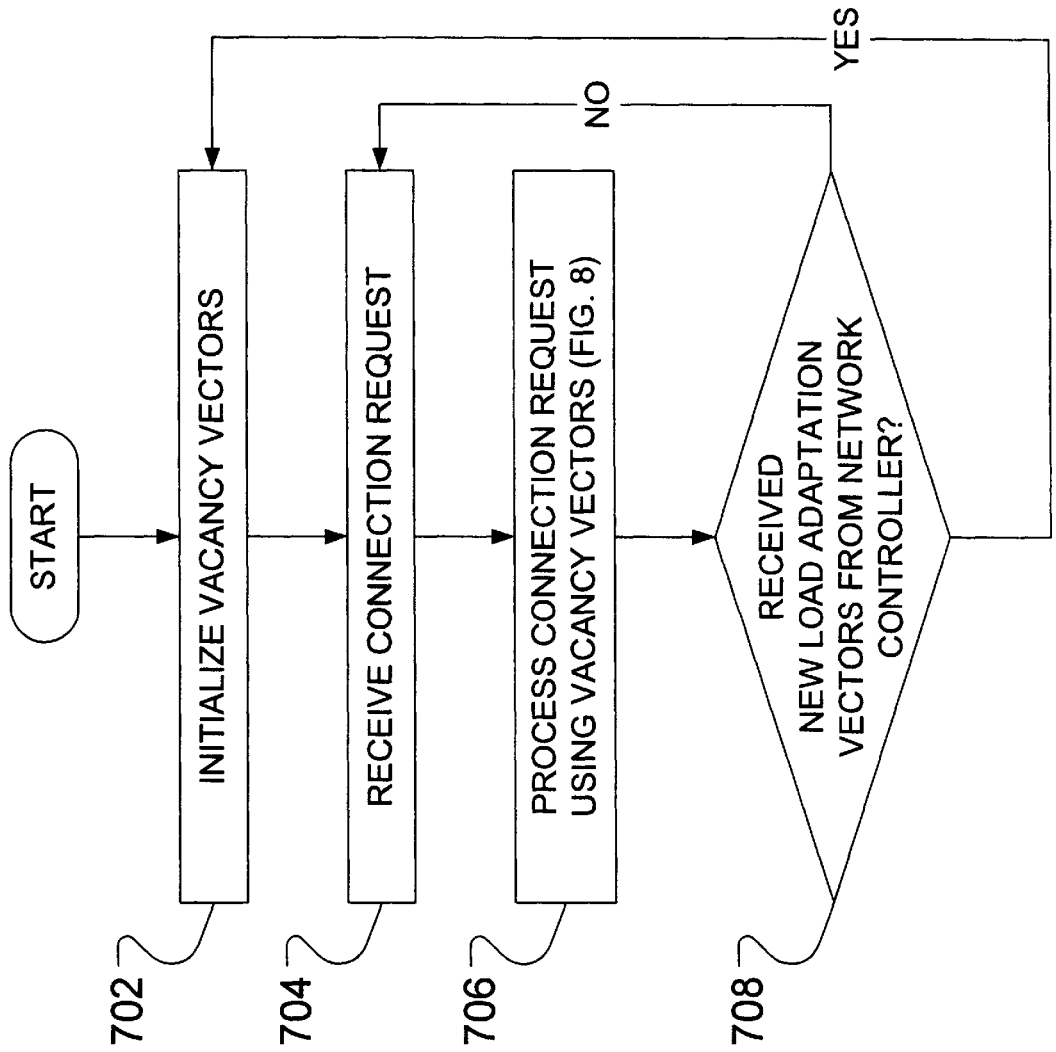
FIG. 7 illustrates, in a flow diagram, a connection request processing method in an embodiment of the present invention.

A traffic allocation method which is performed by a node controller is described in conjunction with FIG. 7. Recall that a nodal routing table comprises a route set associated with each other node. For each route set in the nodal routing table of the node in question, whenever a load-adaptation vector is received, a vacancy vector is initialized (step 702) according to the values in this most recently received load-adaptation vector and corresponding values in the current occupancy vector. Vacancy vector initialization is discussed hereinafter in conjunction with FIG. 14. Note that, like load-adaptation vectors, each vacancy vector has as many elements as the number of routes in a respective route set. Upon receiving a connection request (step 704), the vacancy vector is processed to allocate the connection request to a route in the route set (step 706). It is then determined whether a new set of load-adaptation vectors has arrived from the network controller (step 708). If a new set has arrived, the vacancy vectors are re-initialized (step 702). However, if there has been no change in the status of the load-adaptation vectors, the node controller deals with the next connection request based on the current vacancy vector (step 704).

Figure 8:
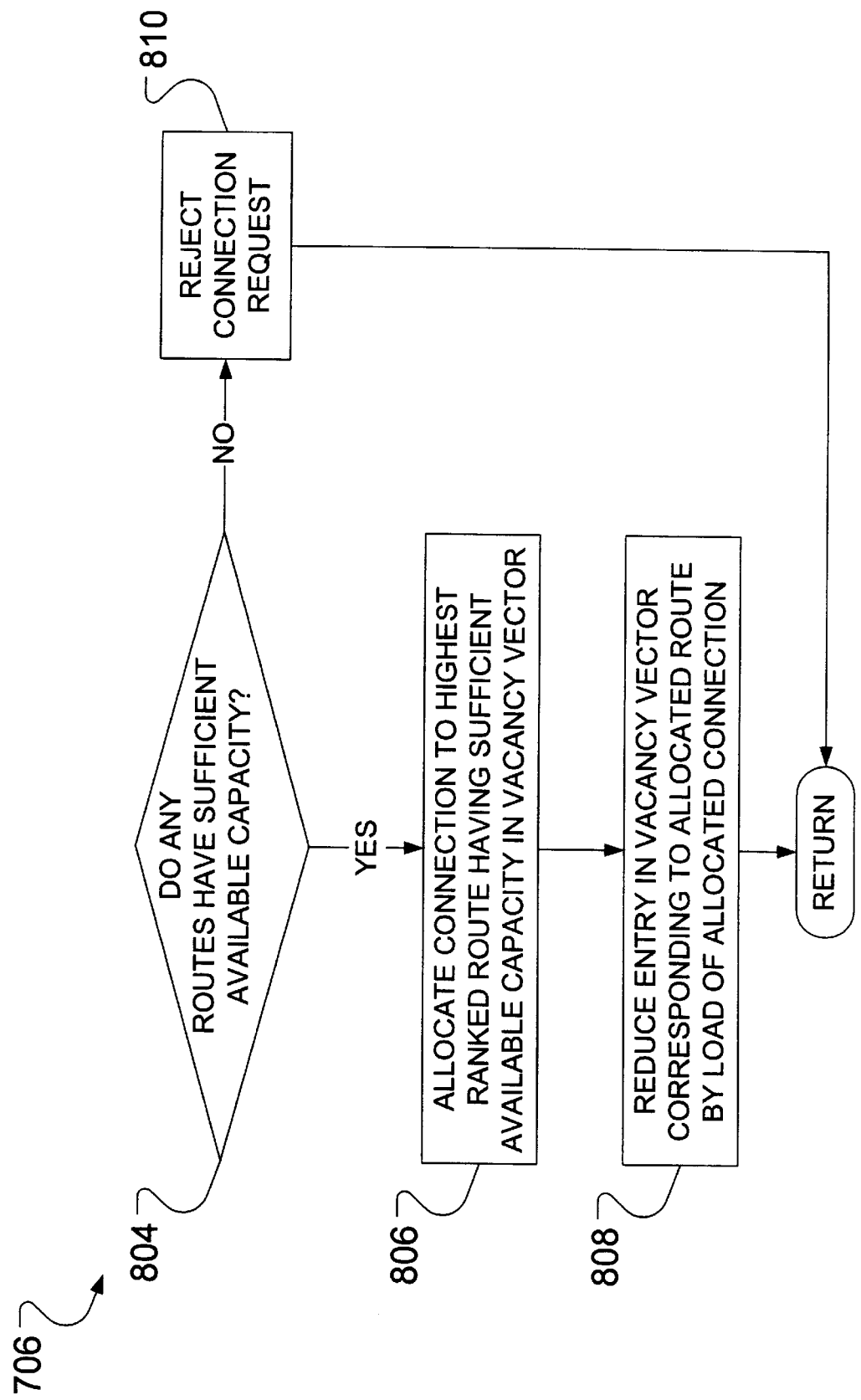
FIG. 8 illustrates, in a flow diagram, a connection allocation method as part of the method illustrated in FIG. 7 in an embodiment of the present invention.

The processing of a vacancy vector to allocate a connection to a route identified in step 706 of FIG. 7 is expanded upon in FIG. 8. Given a traffic load associated with a received request for a connection between a source node and a sink node, the vacancy vector of the node-pair of interest is examined to determine whether any routes in the route set have capacity sufficient to carry the requested load (step 804). If sufficient capacity for the requested load is unavailable, the connection request is rejected (step 810).

However, if the vacancy vector shows that sufficient capacity for the requested load is available, the connection is allocated to the highest ranked route, in the route set, which the vacancy vector shows as having available capacity (step 806). The element in the vacancy vector corresponding to the route allocated the connection is then reduced by the size of the requested load (step 808).

Figure 9:
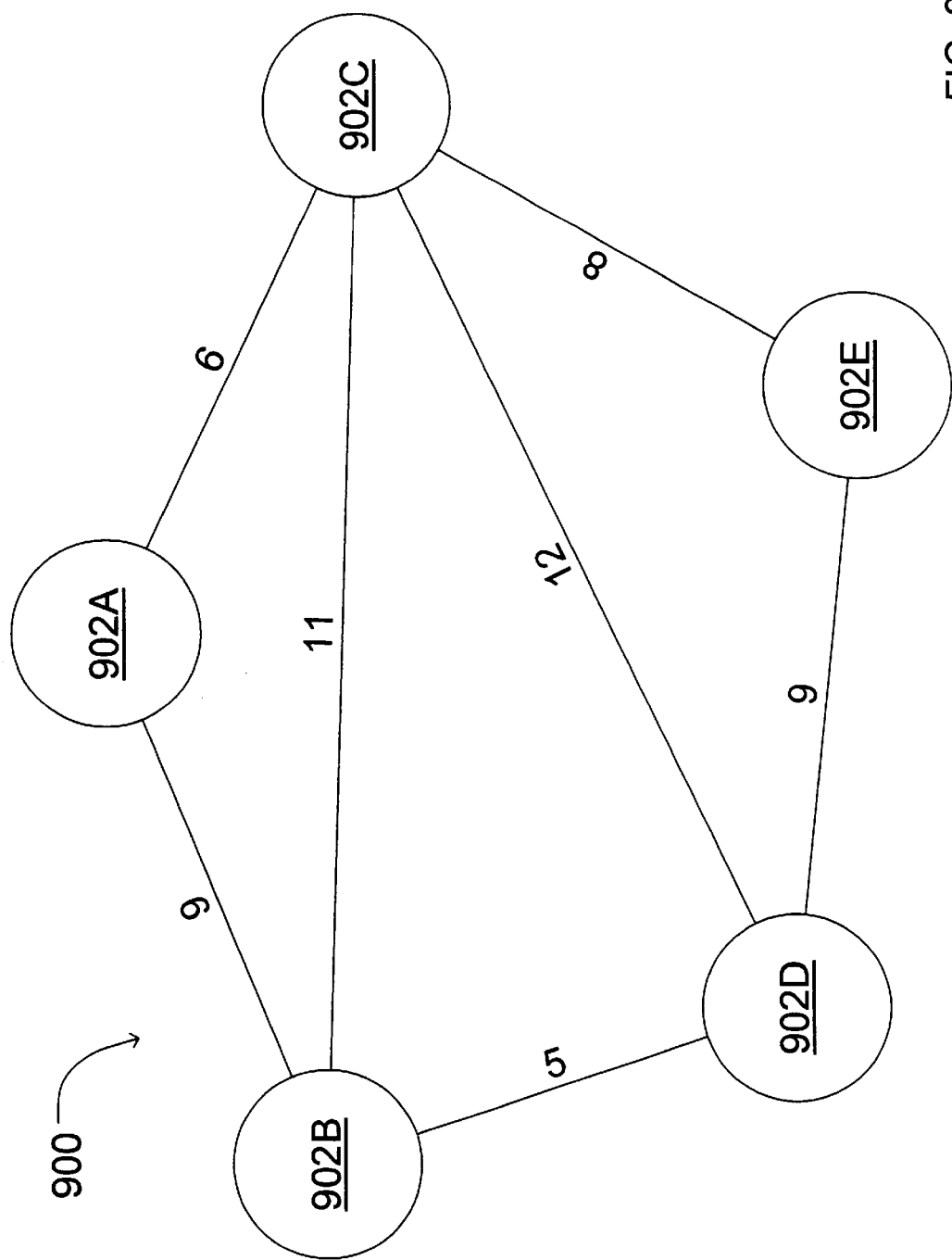
FIG. 9 is a schematic network of nodes representing a communications network.

An example operation of the described system is given in conjunction with the network 900 in FIG. 9, wherein each of the links between nodes 902A, 902B, 902C, 902D and 902E is shown to have associated cost in arbitrary cost units. For simplicity, it is assumed that each line connecting two nodes represents two unidirectional links in opposite directions and further that the two links have the same cost in each direction along the unidirectional links. It is further assumed that each unidirectional link has the same capacity, normalized to unity.

An overall routing table 1000 of independent route sets, that is, route sets determined without regard for traffic between other node-pairs, is illustrated in FIG. 10. To create routing table 1000, independent route sets have been determined for each node-pair (source and destination) in network 900 of FIG. 9. A method of determining independent route sets is described in U.S. patent application Ser. No. 09/405,003, filed Sep. 27, 1999. Once determined, routes for each node-pair are sorted by increasing order of route cost. Each route in routing table 1000 is an ordered list of nodes with an associated number indicating route cost. For brevity, a route such as 902D-902C-902A is expressed as {DCA}. As it has been assumed that each unidirectional link has the capacity normalized to unity, each route in overall routing table 1000 has a capacity of unity.

A traffic matrix 1100, in FIG. 11, quantifies a traffic demand for each possible end-to-end connection in network 900 of FIG. 9. The representative traffic load is expressed in traffic matrix 1100 normalized to link capacity. A value of 1 indicates a requested bit rate equal to a link capacity. The load from a source node to a sink node can, of course, exceed a link capacity. Recall that link capacity itself is measured in bits per second. For example, traffic from 902A to 902D is 0.1 capacity units, which would correspond to one Gigabit per second if the link capacity is ten Gigabits per second.

Figure 12:
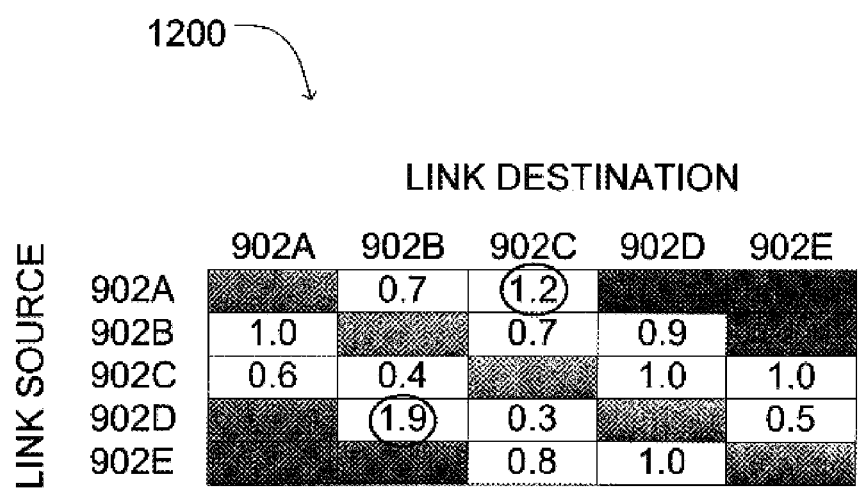
FIG. 12 illustrates a link load matrix for the network of FIG. 9 after load-adaptation vector initialization and mapping of a traffic matrix onto the highest ranked routes.

A load-adaptation vector is initialized for each node-pair which has the effect of tentatively assigning the entire load between the two nodes (as reported in traffic matrix 1100) to the lowest-cost routes in each route set. For example, the load-adaptation vector for node-pair 902A-902E is initialized to [0.5, 0.0] (the 902A-902E route set has two routes) to correspond to a route set of [ACE, ABDE]. Tentatively, since the normalized traffic load is 0.5, 0.5 capacity units are assigned to each of link 902A-902C and link 902C-902E. The load-adaptation vector for node-pair 902A-902C is initialized to [0.7, 0.0] to correspond to route set [AC, ABC]. Then 0.7 capacity units are added to link 902A-902C bringing the total capacity assigned to link 902A-902C to 1.2. The load on each link (link load) resulting from this "selfish" tentative assignment is shown in a link load matrix 1200 (FIG. 12), wherein links that do not exist are shown as blanks. Entries in link load matrix 1200 that exceed 1.0 capacity unit indicate overloaded links. Specifically, links 902A-902C and 902D-902B are overloaded.

A list of potentially overloaded links may be generated. In this example, processing of the list assumes that the traffic loads reported in traffic matrix 1100 can be split among several routes in arbitrary granularity (if a particular load is indivisible, it may be necessary to move the entirety of the load). The link with the highest excess load is link from 902D to 902B with a tentative load of 1.9 capacity units. According to the initialized load-adaptation vectors, traffic between node-pairs 902D-902A, 902D-902B and 902E-902B is assigned to routes that include link 902D-902B.

For each node-pair assigned to routes that include link 902D-902B, a penalty is assessed for reassigning the node-pair traffic to an alternate route. A penalty is assessed to each alternate route. The penalty is the cost difference between the alternate route and the shortest route. The alternate routes for node-pairs 902D-902A, 902D-902B and 902E-902B, and their associated penalties, are as follows:

| Source - Destination | Shortest Route (SR) | SR Cost | Alternate Routes (AR) | AR Cost | Penalty (AR Cost - SR Cost) |
|---|---|---|---|---|---|
| 902D-902A | {DBA} | 14 | {DCA} | 18 | 4 |
|  |  |  | {DECA} | 23 | 9 |
| 902D-902B | {DB} | 5 | {DCB} | 23 | 18 |
|  |  |  | {DECB} | 28 | 23 |
| 902E-902B | {EDB} | 14 | {ECB} | 19 | 5 |

A minimum penalty may be identified in the above as corresponding to alternate route {DCA}. The traffic load on node-pair 902D-902A, as determined from traffic matrix 1100, is 0.3 capacity units. Further, from link load matrix 1200 it is seen that, on route {DCA}, 0.7 capacity units are available on link 902D-902C and 0.4 capacity units are available on link 902C-902A. Route {DCA} may be said to have 0.4 capacity units of excess capacity. The excess load on link 902D-902B is 0.9 capacity units. The entire 902D-902A traffic load (0.3 capacity units) may be assigned from route {DBA} to route {DCA}. In other words, the load-adaptation vector for node-pair 902D-902A is changed from its initialized value of [0.3, 0.0, 0.0] to [0.0, 0.3, 0.0]. After the load on all links is adjusted accordingly, the load on link 902D-902B is reduced from 1.9 to 1.6 capacity units.

The next node pair to be considered for reducing the potential overload on link 902D-902B is 902E-902B which has an alternate-route penalty of five cost units. The traffic demand for node pair 902E-902B is 0.2 units and the second-best alternate route is {ECB}. The excess capacities in links 902E-902C and 902C-902B are 0.2 and 0.6, respectively. Therefore, 0.2 capacity units are allocated across route {ECB}, resulting in a change of load-adaptation vector for node-pair 902E-902B from [0.2, 0] to [0, 0.2]. After the load on all links is adjusted accordingly, the load on link 902D-902B is reduced from 1.6 to 1.4 capacity units, which still exceeds the physical capacity of the link by 0.4 capacity units.

The last node-pair to be considered is 902D-902B which has two alternate routes {DCB} and {DECB}, the former incurring a lower penalty (18 cost units) than the latter (23 cost units). Link 902D-902C has an excess capacity of 0.4 units and link 902C-902B now has an excess capacity of 0.4 (after accounting for the re-routing of the 0.2 load units from {EDB} to {ECB}). Hence the excess load of 0.4 units on link 902D-902B may be transferred to route { DCB }, resulting in a change of the respective load-adaptation vector from [1.4, 0.0, 0.0] to [1.0, 0.4, 0.0]. After the load on all links is adjusted accordingly, the load on link 902D-902B is reduced from 1.4 to 1.0 capacity units.

The next most overloaded link is link 902A-902C with a load of 1.2 capacity units. Traffic loads assigned to node-pairs 902A-902C and 902A-902E are identified as making use of link 902A-902C. The alternate routes for these node-pairs and the associated penalties are:

| Source - Destination | Shortest Route (SR) | SR Cost | Alternate Routes (AR) | AR Cost | Penalty (AR Cost - SR Cost) |
|---|---|---|---|---|---|
| 902A-902C | {AC} | 6 | {ABC} | 20 | 14 |
| 902A-902E | {ACE} | 14 | {ABDE} | 23 | 9 |

The alternate route with the lowest cost penalty is {ABDE} with a penalty of 9 cost units. The traffic demand for node-pair 902A-902E is 0.5 capacity units. The excess load on link 902A-902C is 0.2 capacity units. However, excess capacity on alternate route {ABDE} is limited to the 0.1 capacity units on link 902B-902D. Therefore, with the assumption of a divisible traffic load, 0.1 capacity units may be transferred from route {ACE} to route {ABDE}.

The excess load on link 902A-902C is now 0.1 capacity units. The next alternate route with the lowest penalty, in fact, the only alternate route left, is route {ABC} with a penalty of 14 cost units and room for 0.2 capacity units. Traffic demand for node-pair 902A-902C is 0.7 capacity units. Therefore, 0.1 capacity units may be transferred from route {AC} to route {ABC}. The load-adaptation vector for node-pair 902A-902C is adjusted to [0.6, 0.1] and for node-pair 902A-902E is adjusted to [0.4, 0.1].

Figure 13:
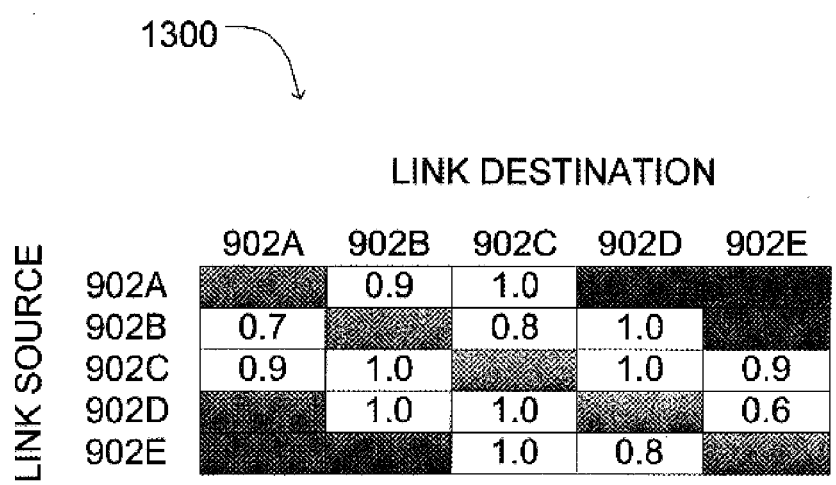
FIG. 13 illustrates a link load matrix for the network of FIG. 9 after processing of a list of potentially overloaded links.

As the list of potentially overloaded links is now empty, the processing of overloaded links is complete. The adjusted tentative load on links in network 900, due to courteous route assignment, is shown as link load matrix 1300, in FIG. 13.

Given the above processing, the following initial load-adaptation vectors (which are derived from FIG. 11) are modified to the following modified load-adaptation vectors:

| Node-pair | Initial Load-Adaptation Vector | Modified Load-Adaptation Vector |
|---|---|---|
| 902A-902C | [0.7, 0.0] | [0.6, 0.1] |
| 902A-902E | [0.5, 0.0] | [0.4, 0.1] |
| 902D-902A | [0.3, 0.0, 0.0] | [0.0, 0.3, 0.0] |
| 902D-902B | [1.4, 0.0, 0.0] | [1.0, 0.4, 0.0] |
| 902E-902B | [0.2, 0.0] | [0.0, 0.2] |

The load-adaptation vectors may then be distributed to the corresponding nodes. At node 902A in network 900, the first row of routing table 1000 (FIG. 10), which includes the route sets for node-pairs wherein node 902A is the source, is received. Subsequently, a load-adaptation vector for each route set is received. A vacancy vector is then initialized for each node-pair (i.e., each route set) to equal the difference between a corresponding new load-adaptation vector and a current occupancy vector. If a request to connect node 902A to node 902C having an associated load size of 0.4 capacity units is then received, the first element in the vacancy vector for node-pair 902A-902C is compared to the load size. Assuming an occupancy vector of [0.0, 0.0], the value of the first element in the vacancy vector (0.6) will exceed the load size (0.4). The connection request may therefore be allocated to the route corresponding to that element, {AC}. The available capacity of the first element is then reduced by the load size resulting in a vacancy vector corresponding to 902A-902C of [0.2, 0.1] and a corresponding occupancy vector of [0.4, 0.0]. Note that, for a new load-adaptation vector to be accepted by a node controller, each element in the new load-adaptation vector must exceed or equal a corresponding element in a current occupancy vector. If an element in a new load-adaptation vector is less than a corresponding element in a current occupancy vector, the new load-adaptation vector is perceived to be erroneous and is rejected by the node controller. Until a new load-adaptation vector is accepted by the node controller, traffic on the links of the route corresponding to the load-adaptation vector element in question may experience blocking of the sort that occurs in current "selfish" networks.

Figure 14:
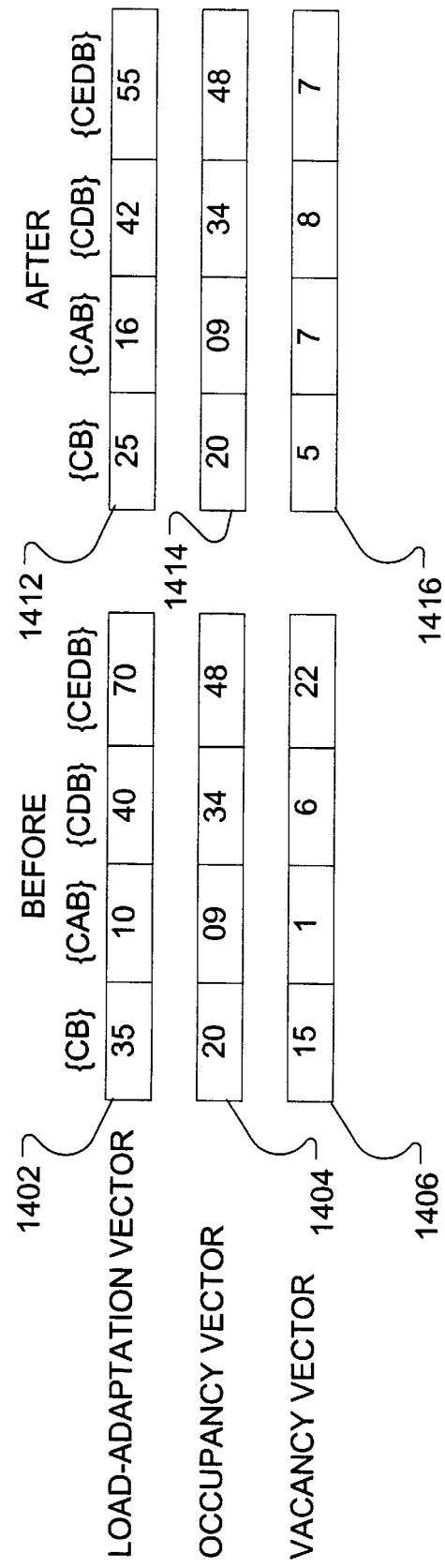
FIG. 14 illustrates occupancy and vacancy vectors before and after the receipt of a new load-adaptation vector.

In FIG. 14, an example is presented to illustrate changes in occupancy and vacancy vectors of node-pair 902C-902B in response to receipt of a new load-adaptation vector. An arbitrary load unit is used in this illustration. Based on an original load-adaptation vector 1402, traffic has been allocated to result in an occupancy vector 1404 and a corresponding vacancy vector 1406. Upon receipt of a new load-adaptation vector 1412, a new occupancy vector 1414 is unchanged from the original occupancy vector 1414. However, a new vacancy vector 1416 is created with values representing the difference between the new load-adaptation vector 1412 and the occupancy vector 1414.

Consider, with further regard to FIG. 14, a request to connect node 902C to node 902B having an associated load size of sixcapacity units. The routes may be seen to be ranked such that the highest ranked route is furthest to the left in FIG. 14. The value (five) of the element, in the vacancy vector 1416, corresponding to the highest ranked route, which is {CB}, is exceeded by the load size. Hence, if the connection request may be divided, five capacity units may be allocated to route {CB} and one capacity unit allocated to second ranked route {CAB}. However, if the request is indivisible, the entire request may be allocated to route {CAB}, which is ranked second, but can accommodate the entire request.

It is preferable that overall routing-table formulation (step 202, FIG. 2) be performed with a frequency determined by planned network topology changes, for example the addition or removal of a node or the addition of new links to a node. It is further expected that new load-adaptation vector updating (step 308, FIG. 3) will occur, when triggered by traffic deviation metric exceeding a threshold, with a much greater frequency (say, once every two seconds).

Figure 15:
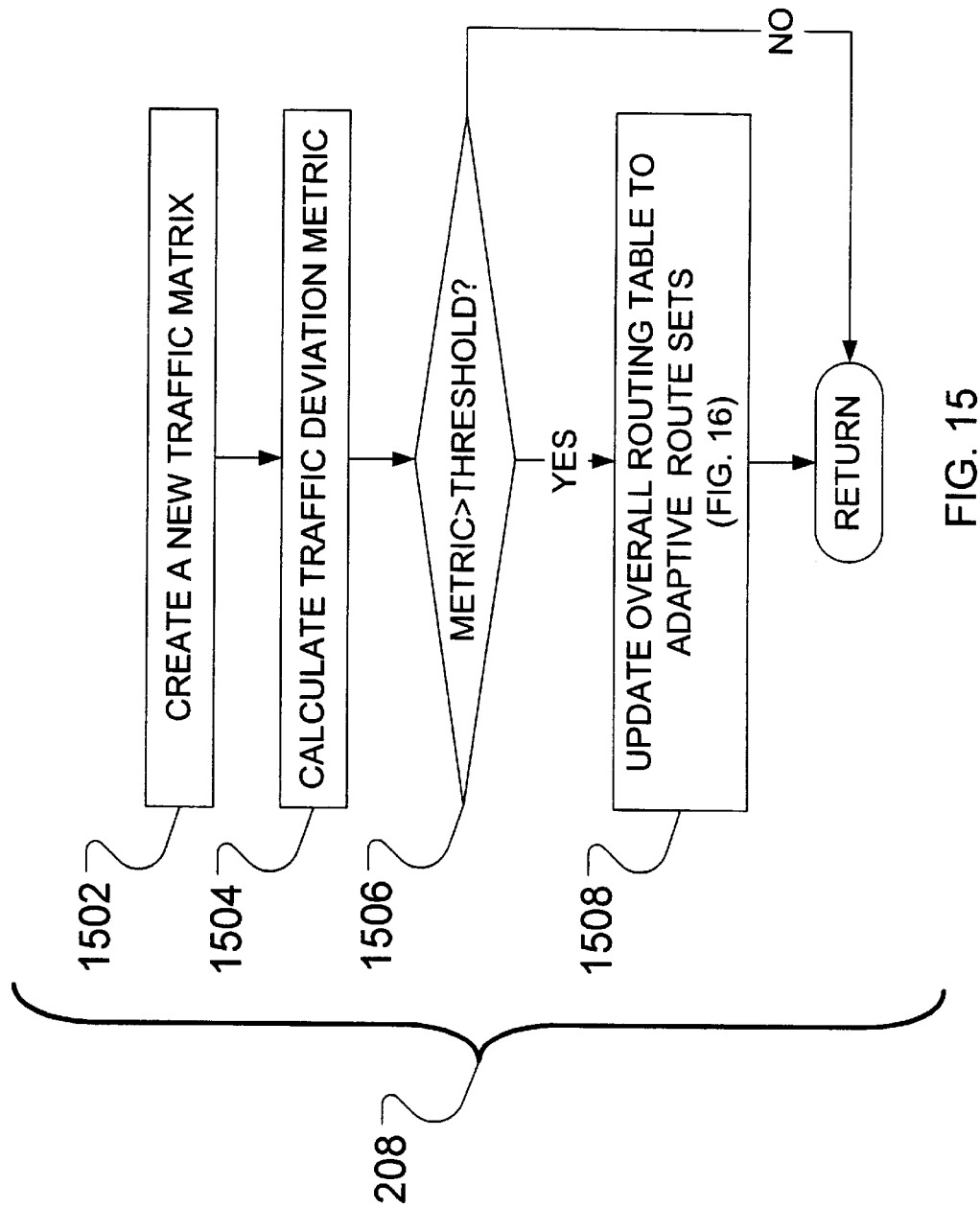
FIG. 15 illustrates, in a flow diagram, a traffic measurement processing method as part of the method illustrated in FIG. 2 in a second embodiment of the present invention.

In another embodiment of the present invention, the adaptive routing information determined in step 208 (FIG. 2), based on received traffic information, takes the form of adaptive routing tables. The processing steps are illustrated in FIG. 15. As in the processing of FIG. 3, initially a new traffic matrix is created (step 1502). The new traffic matrix may then be used to calculate a traffic deviation metric (step 1504) through comparison, described hereinbefore in conjunction with FIG. 3, with a previous traffic matrix. The traffic deviation metric is compared to a predetermined threshold (step 1506). If the traffic deviation metric does not exceed the threshold, the traffic processing is complete. However, if the traffic deviation metric exceeds the threshold, the set of adaptive routing tables is updated (step 1508).

Figure 16:
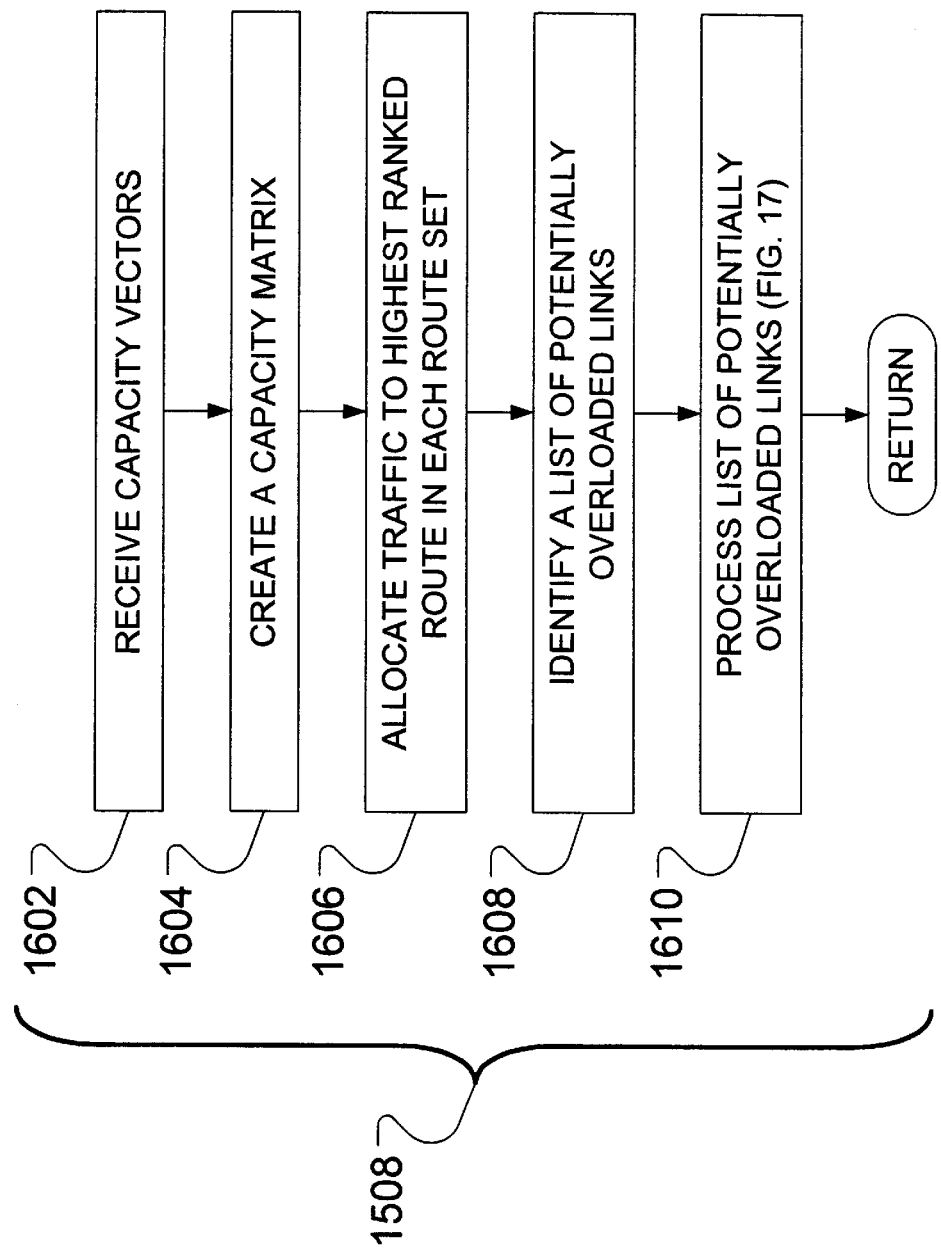
FIG. 16 illustrates, in a flow diagram, an adaptive routing table determination method as part of the method illustrated in FIG. 15.
Figure 17:
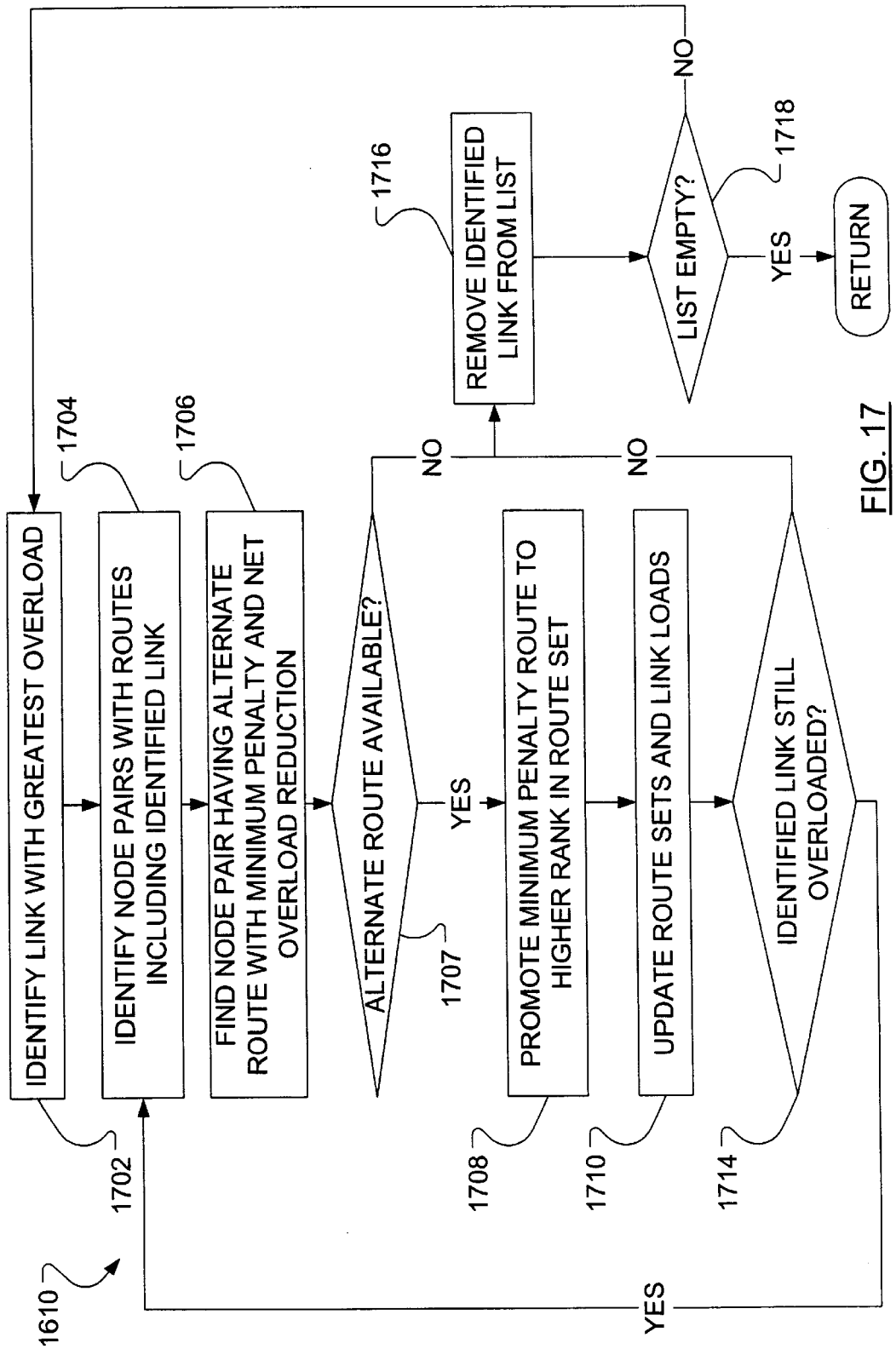
FIG. 17 illustrates, in a flow diagram, an overloaded link processing method as part of the method illustrated in FIG. 16.

FIG. 16 illustrates steps involved in a procedure, used in step 1508 of FIG. 15, for determining adaptive routing tables. Once capacity vectors have been received from node controllers (step 1602), the network controller can create a capacity matrix (step 1604) indicating the capacity of each link. Traffic is then allocated to the highest ranked route in corresponding route sets in the overall routing table (step 1606). Traffic loads, as recorded in the traffic matrix, are then allocated to routes according to the initialized load-adaptation vectors. Based on this allocation, a link load matrix may be generated to indicate the traffic load on each link. Using this link load matrix, potentially overloaded links are identified and used to form a list ranked from greatest to least excess load (step 1608). The list created in step 1608 is then processed to reduce, and, if possible, eliminate, traffic load in excess of the capacity of each of the links in the list (step 1610). The goal of step 1610, then, is to minimize the quantity of links in the list. Processing of potentially overloaded links in step 1610 of FIG. 16 may be accomplished according to the flow diagram of FIG. 17. Initially, the one link, in the list of potentially overloaded links, having the greatest potential overload is identified (step 1702). Node-pairs having route sets in which are routes including the identified link are then identified (step 1704). For each node-pair identified in step 1704 as employing the identified link, alternate routes from source node to sink node are considered. A penalty is assessed to each of the considered alternate routes based on a difference in cost relative to the route including the overloaded link and the load that may be transferred to the alternate route (step 1706). If an alternate route is determined to be available (step 1707), the alternate route may then be promoted to a rank above that of the route which includes the identified link (step 1708). Given the promotion in step 1708, the route sets and link loads are updated (step 1710) thus reducing the amount of overload on the identified link by the capacity of the alternate route. Promoting an alternate route to a rank above that of the route which includes the identified link may overload another link. Accordingly, care should be taken to select an alternate route that at least results in a net reduction of overload. Once the updates of step 1710 are complete, the link in question may be re-examined to determine whether the link is still overloaded (step 1714). If the link is still overloaded, those node-pairs having traffic load allocated to routes which include the identified link are again identified (step 1704) and the process of reducing load on the overloaded link repeated. If the identified link is determined to no longer be overloaded, it is removed from the list of overloaded links (step 1716). If a test (step 1718) determines that overloaded links remain in the list, the process may begin again with the most overloaded link. Removal of the link from the list (step 1716) and review of the list (step 1718) may also occur if an alternate route is determined not to be available in step 1707. If the list is determined in step 1718 to be empty, the overloaded link processing is complete.

Returning to FIG. 1, as will be apparent to a person skilled in the art, in a large-scale network, having, for example, several thousand nodes, network controller 104 may be distributed among nodes 102 and each control channel 122 may be a virtual channel sharing payload links 120. Such a distributed network controller would comprise a number of coordinated network controllers, each attached to a node 102.

In the case of a very large network, having several thousand nodes for example, the traffic matrices tend to be sparse. In such a case, efficient data structures, well known in the art, may be used to store traffic demand and link loads.

A person skilled in the art may now conceive of alternate structures and embodiments or variations of the above. All those which fall within the scope of the claims appended hereto are considered to be part of the present invention.

We claim:

1. At a controller of a network, said network comprising nodes and links between said nodes, each of said links having a known capacity, and where a set of routes is associated with each pair of said nodes, where a pair of said nodes includes a source node and a sink node, a method of distributing routing information to said nodes, said method comprising:

receiving traffic information from said nodes, said traffic information including an indication of a traffic load from said source node to said sink node for said each pair of said nodes;

based on said traffic information, determining a load-adaptation vector for a given pair of said nodes, said load-adaptation vector specifying an amount of a given traffic load for said given pair of said nodes allocated to each route in the set of routes associated with said given pair of said nodes; and transmitting said load-adaptation vector to each node of said given pair of nodes for use by said each node in making traffic routing decisions.

2. The method of claim 1 wherein each route in each said set of routes is associated with a rank and said determining comprises:

tentatively allocating portions of said traffic load for said each pair of said nodes to each route in said set of routes associated with said each pair of said nodes according to said rank associated with said each route and an initialized load-adaptation vector for said each pair of said nodes;

generating, based on said allocating, a link load matrix to indicate a traffic load on each link of said each route;

identifying, from said link load matrix, oversubscribed links, wherein a given link is an oversubscribed link if said given link is tentatively allocated a traffic load exceeding a corresponding known capacity;

selecting a particular oversubscribed link from among said oversubscribed links;

adjusting a particular load-adaptation vector for a particular pair of said nodes to give an adjusted load-adaptation vector, where a particular route in said set of routes associated with said particular pair of said nodes includes said particular oversubscribed link; and tentatively re-allocating portions of said traffic load for said each pair of said nodes to each route in said set of routes associated with said each pair of said nodes according to said adjusted load-adaptation vector.

3. The method of claim 2 wherein:

said selecting further comprises identifying said particular oversubscribed link as a link, among said oversubscribed links, having a tentatively allocated traffic load exceeding said corresponding known capacity by the greatest amount; and said adjusting comprises reducing said greatest amount by re-allocating said traffic load in said particular load-adaptation vector.

4. At a controller of a network, said network comprising nodes and links between said nodes, a method of distributing routing information to said nodes, said method comprising:

receiving traffic information from said nodes;

based on said received traffic information, determining adaptive routing information corresponding to each said node, wherein said determining includes, based on said received traffic information:

initializing said adaptive routing information corresponding to each said node;

identifying a list of potentially overloaded links;

identifying a particular link, in said list, having a greatest potential overload;

identifying each node-pair having a route including said particular link;

for each identified node-pair, assessing a penalty to each alternate route in each route set corresponding to said each identified node-pair;

identifying an alternate route having a minimum penalty; and adjusting said adaptive routing information corresponding to a node-pair having said minimum penalty alternate route; and transmitting to each said node said corresponding adaptive routine information for use by each said node in making traffic routing decisions.

5. The method of claim 4 wherein said adaptive routing information comprises a set of load-adaptation vectors and said adaptive routing information corresponding to said node-pair having said minimum penalty alternate route comprises a particular load-adaptation vector.

6. The method of claim 5 wherein said adjusting comprises:

decreasing a value of an element of said particular load-adaptation vector corresponding to said route including said given link by an amount; and increasing a value of an element of said particular load-adaptation vector corresponding to said minimum penalty alternate route by said amount.

7. The method of claim 4 further comprising repeating said reducing until said potential overload is eliminated.

8. The method of claim 4 wherein said adaptive routing information comprises an adaptive routing table.

9. The method of claim 4 further comprising:

determining a traffic deviation metric based on said received traffic information; and if said traffic deviation metric exceeds a threshold, updating said adaptive routing information.

10. The method of claim 9 where said updating comprises comparing said received traffic information with previously received traffic information.

11. A computer readable medium containing computer-executable instructions which when performed by a processor in a controller of a network, cause the processor to:

receive traffic information from a plurality of nodes of said network, said traffic information including an indication of a traffic load for said each pair of said plurality of nodes;

based on said traffic information, determine a load-adaptation vector for a given pair of node of said plurality of nodes, said load-adaptation vector specifying an amount of a given traffic load for said given pair of nodes allocated to each route in a set of routes associated with said given pair of nodes; and transmit said load-adaptation vector to each node of said given pair of nodes for use by said each node of said given pair of nodes in making traffic routing decisions.

12. In a network including nodes interconnected by links, where each of said nodes has a set of routes corresponding to each other of said nodes, a method of route capacity allocation, comprising:

determining tentative node-specific load-adaptation vectors for use by said nodes in traffic load allocation;

receiving traffic information from said nodes;

based on said received traffic information and said tentative node-specific load-adaptive vectors, ascertaining that traffic load allocated to at least two routes having a common link exceeds a known capacity of said common link, responsive to said ascertaining, altering at least one of said node-specific load-adaptation vectors to give altered node-specific load-adaptation vectors that cause a proportion of capacity allocated to at least one of said at least two routes to be allocated to at least one alternate route; and transmitting said altered node-specific load-adaptation vectors to each of said nodes to which said altered node-specific load-adaptation vectors are specific.

13. At a first node in a network, said network comprising nodes, links between said nodes and a controller, a method of allocating connection requests to routes, said method comprising:

receiving a load-adaptation vector corresponding to a route set that includes ranked routes between said first node and a second node in said network, each element in said load-adaptation vector corresponding to a unique route in said route set and having a value for influencing allocation of traffic to said unique route;

initializing a vacancy vector, corresponding to said route set, based on said load-adaptation vector, each element in said vacancy vector having a value indicating available capacity for a route in said route set;

receiving a request to connect said first node to said second node, said request having an associated load size;

comparing elements in said vacancy vector, in order of decreasing rank, to said associated load size until a value of one element in said vacancy vector exceeds or equals said associated load size;

allocating said request to a route corresponding to said one element; and reducing a value of said one element by said associated load size.

14. The method of claim 13 further comprising, after a connection resulting from said allocating is terminated, increasing said value of said one element by said associated load size.

15. The method of claim 13 further comprising receiving a new load-adaptation vector and re-initializing said vacancy vector based on said new load-adaptation vector.

16. The method of claim 13 further comprising:

receiving link state change information; and determining an influenced route in said route set, were said influenced route is influenced by said link state change information.

17. The method of claim 16 further comprising, where said link state change information indicates a link failure, nullifying an element in said vacancy vector corresponding to said influenced route.

18. The method of claim 16 further comprising, where said link state change information indicates a link recovery, restoring an element, in said vacancy vector corresponding to said influenced route, to a value of a corresponding element in said load-adaptation vector.

19. The method of claim 13 farther comprising, where said associated load size exceeds the value of each element in said vacancy vector, rejecting said request.

20. In a network comprising nodes and links between said nodes, a first node comprising:

means for receiving a load-adaptation vector corresponding to a route set that includes ranked routes between said first node and a second node in said network, each element in said load-adaptation vector corresponding to a unique route in said route set and having a value for influencing allocation of traffic to said unique route;

means for receiving a request to connect said first node to said second node, said request having an associated load size;

processing means for adapting said first node to be operable to:
  initialize a vacancy vector, corresponding to said route set, based on said load-adaptation vector, each element in said vacancy vector having a value indicating available capacity for a route in said route set;
  compare elements in said vacancy vector, in order of decreasing rank, to said associated load size until a value of one clement in said vacancy vector exceeds or equals said associated load size;
  allocate said request to a route corresponding to said one element; and
  reduce a value of said one element by said associated load size.

21. In a network comprising nodes and links between said nodes, a first node operable to:
  receive a load-adaptation vectors corresponding to a route set that includes ranked routes between said first node and a second node in said network, each element in said load-adaptation vector corresponding to a unique route in said route set and having a value for influencing allocation of traffic to said unique route;
  initialize a vacancy vector, corresponding to said route set, based on said load-adaptation vector, each element in said vacancy vector having a value indicating available capacity for a route in said route set;
  receive a request to connect said first node to said second node, said request having an associated load size;
  compare elements in said vacancy vector, in order of decreasing rank, to said associated load size until a value of one element in said vacancy vector exceeds or equals said associated load size;
  allocate said request to a route corresponding to said one element; and
  reduce a value of said availal one given element by said associated load size.

22. A computer readable medium containing computer-executable instructions which, when performed by a processor in a router in a network, said network having nodes and links between said nodes cause the processor to:
  receive a load-adaptation vector, corresponding to a route set that includes ranked routes between said router and a second node in said network, each element in said load-adaptation vector corresponding to a unique route in said route set and having a value for influencing allocation of traffic to said unique route;
  initialize a vacancy vector, corresponding to said route set, based on said load-adaptation vector, each element in said vacancy vector having a value indicating available capacity for a route in said route set;
  receive a request to connect said router to said second node, said request having an associated load size;
  compare elements in said vacancy vector, in order of decreasing rank to said associated load size until a value of one element in said vacancy vector exceeds or equals said associated load size;
  allocate said request to a route corresponding to said one element; and
  reduce a value of said one element by said associatied load size.

23. In a network comprising nodes, links between said nodes and a network controller, a first node comprising:
  means for determining a capacity requirement to a second node in said network;
  means for communicating said capacity requirement to said network controller;
  means for receiving, from said network controller, a load-adaptation vector, said load-adaptation vector corresponding to a route set comprising different routes between said first node and said second node, each element in said load-adaptation vector corresponding to a unique route in said route set and having a value for restricting allocation of traffic to said unique route;
  means for receiving a request to connect said first node to said second node, said request having an associated load size; and
  means for assigning each of said requests to one of said routes according to said load-adaptation vector.

* * * * *

UNITED STATES PATENT AND TRADEMARK OFFICE
CERTIFICATE OF CORRECTION

PATENT NO. : 6,768,718 B1
DATED : July 21, 2004
INVENTOR(S) : Beshai et al.

It is certified that error appears in the above-identified patent and that said Letters Patent is hereby corrected as shown below:

Column 15,
Lines 6-7, "adaptive routine information" should be -- adaptive routing information --
Line 60, "load-adaptive vectors" should be -- load-adaptation vectors --

Column 17,
Line 36, "said avail one given element" should be -- said one element --

Signed and Sealed this

Fourteenth Day of December, 2004

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,768,718 B1 | Page 1 of 1 |
| APPLICATION NO. | : 09/630190 | |
| DATED | : July 27, 2004 | |
| INVENTOR(S) | : Maged E. Beshai and François J. Blouin | |

It is certified that error appears in the above-identified patent and that said Letters Patent is hereby corrected as shown below:

The following acknowledgement of government rights in the invention should precede the FIELD OF THE INVENTION section:

GOVERNMENT LICENSE RIGHTS

This invention was made with Government support under Technology Investment Agreement F30602-98-2-0194 awarded by the Air Force. The Government has certain rights in the invention.

Signed and Sealed this

Fifth Day of December, 2006

JON W. DUDAS
*Director of the United States Patent and Trademark Office*